United States Patent
Liu et al.

(10) Patent No.: US 9,082,031 B2
(45) Date of Patent: Jul. 14, 2015

(54) PACKAGE-ON-PACKAGE BASED INTEGRATED CIRCUIT CHIP IMAGER

(71) Applicant: Honeywell International, Inc., Fort Mill, SC (US)

(72) Inventors: Yong Liu, Suzhou (CN); Taylor Smith, Charlotte, NC (US); Ynjiun Paul Wang, Cupertino, CA (US); Xi Tao, Suzhou (CN)

(73) Assignee: Honeywell International, Inc., Fort Mill, SC (US)

( * ) Notice: Subject to any disclaimer, the term of this patent is extended or adjusted under 35 U.S.C. 154(b) by 14 days.

(21) Appl. No.: 14/032,989

(22) Filed: Sep. 20, 2013

(65) Prior Publication Data

US 2014/0166759 A1    Jun. 19, 2014

(51) Int. Cl.
   *G06K 7/10* (2006.01)

(52) U.S. Cl.
   CPC .................................. *G06K 7/1098* (2013.01)

(58) Field of Classification Search
   CPC .......... H01L 2224/32145; H01L 25/0657; H01L 27/14643; H01L 2224/16145; G06K 7/1098; G06K 7/10
   USPC ............. 235/462.01, 462.45, 472.01–472.03, 235/462.21
   See application file for complete search history.

(56) References Cited

U.S. PATENT DOCUMENTS

| | | | |
|---|---|---|---|
| 6,060,722 A * | 5/2000 | Havens et al. | 250/566 |
| 7,425,758 B2 | 9/2008 | Corisis et al. | |
| 7,915,077 B2 | 3/2011 | Corisis et al. | |
| 8,115,112 B2 | 2/2012 | Corisis et al. | |
| 8,127,992 B2 | 3/2012 | Hussey et al. | |
| 2005/0029360 A1* | 2/2005 | Rhelimi | 235/492 |
| 2007/0108284 A1 | 5/2007 | Pankow et al. | |
| 2007/0138289 A1* | 6/2007 | Melick et al. | 235/462.41 |
| 2007/0241195 A1 | 10/2007 | Hussey et al. | |
| 2008/0180566 A1* | 7/2008 | Singh | 348/373 |
| 2009/0002961 A1 | 1/2009 | Camacho et al. | |
| 2009/0212397 A1* | 8/2009 | Tuttle | 257/618 |
| 2009/0240816 A1* | 9/2009 | Philyaw et al. | 709/227 |
| 2010/0053423 A1* | 3/2010 | Singh | 348/374 |
| 2010/0233831 A1* | 9/2010 | Pohl et al. | 438/15 |
| 2011/0055490 A1 | 3/2011 | Gentric et al. | |
| 2012/0015457 A1 | 1/2012 | Rawlinson et al. | |

* cited by examiner

*Primary Examiner* — Tuyen K Vo
(74) *Attorney, Agent, or Firm* — Additon, Higgins & Pendleton, P.A.

(57) ABSTRACT

An apparatus for use in decoding a bar code symbol includes a first integrated circuit chip with a wafer level camera, at least one light source, and a plurality of contact pads on a surface of the chip and a second integrated circuit chip with a processor, memory, plurality of contact pads on a surface of the chip, and plurality of contact pads on another surface of the chip. The apparatus includes a PCB having a plurality of contact pads disposed on at least one surface of the PCB and wherein the first and second integrated circuit chips are vertically stacked on the PCB and the plurality of contact pads on the first and second integrated circuit chips interface with the contact pads of the second integrated circuit chip and PCB. The apparatus is operative for processing image signals generated by the WLC for attempting to decode the bar code symbol.

15 Claims, 7 Drawing Sheets

PACKAGE-ON-PACKAGE BASED INTEGRATED CIRCUIT CHIP IMAGER

CROSS REFERENCE TO RELATED APPLICATIONS

This application claims the benefit of priority under 35 U.S.C. §119 from Chinese Patent Application No. 201210360191.3 filed Sep. 25, 2012 in The State Intellectual Property Office of the People's Republic of China (SIPO). The above application (Chinese Patent Application No. 201210360191.3 filed Sep. 25, 2012 in SIPO) is incorporated herein by reference in its entirety.

FIELD OF THE INVENTION

The present invention relates, in general, to decoding of bar code symbols, and is particularly related to an apparatus for use in decoding a bar code symbol with multiple elements supported on a common printed circuit board.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

SUMMARY OF THE INVENTION

Figure 1:
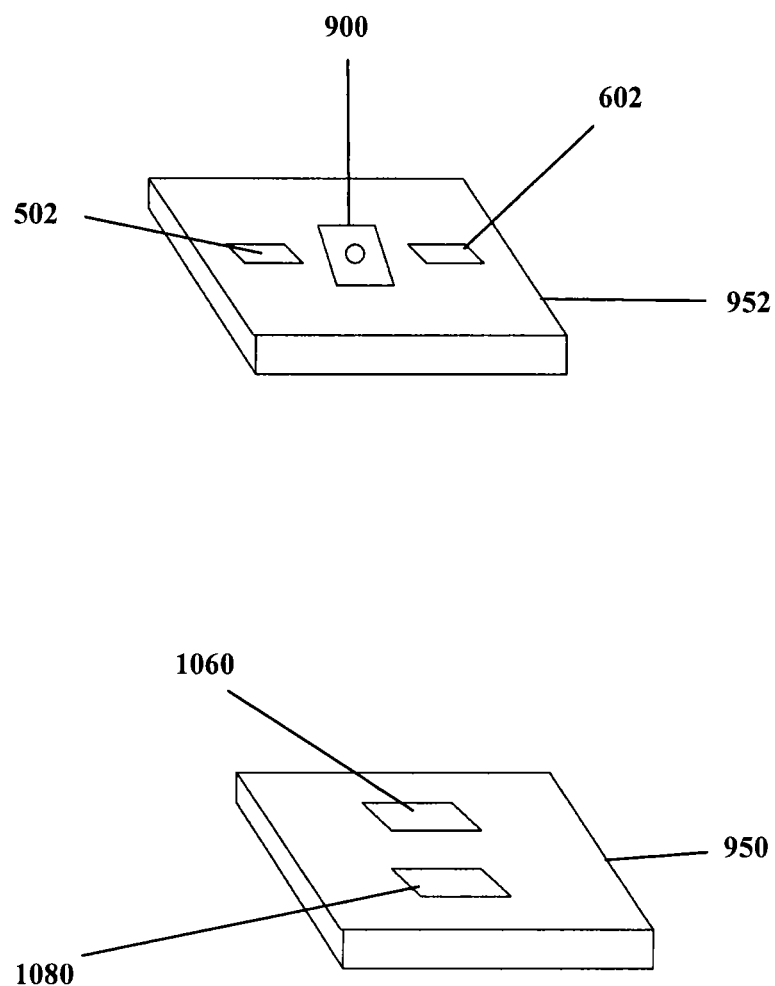
FIG. 1 is a perspective view of two integrated circuit chips of an apparatus for use in decoding a bar code symbol, in accordance with an aspect of the invention.

According to one aspect, an invention for use in decoding a bar code symbol is provided. The apparatus may include a first integrated circuit chip having a wafer level camera with a sensor and a lens, at least one light source, and a plurality of contact pads on a surface of the first integrated circuit chip. The apparatus may also include a second integrated circuit chip having a processor, a memory, and a plurality of contact pads on a first surface of the second integrated circuit chip and a plurality of contact pads disposed on a second surface of the second integrated circuit chip. The apparatus may further have a printed circuit board having a plurality of contact pads disposed on at least one surface of the printed circuit board. The first integrated circuit chip and the second integrated circuit chip are stacked in an X-Y plane on the printed circuit board in a manner that the plurality of contact pads on the first integrated circuit chip define an interface with the plurality of contact pads on the second integrated circuit chip to allow the communication of signals between the first integrated circuit chip and the second integrated circuit chip, and the plurality of contact pads on the second integrated circuit chip define an interface with the plurality of contact pads on the printed circuit board to allow the communication of signals between the first integrated circuit chip, second integrated circuit chip, and the printed circuit board. The apparatus is operative for processing of image signals generated by the wafer level camera for attempting to decode the bar code symbol.

According to alternative aspects, the apparatus may further comprise a printed circuit board having a first side and a second side. In one aspect, the first integrated circuit chip may be mounted on the second integrated circuit chip and the second integrated circuit chip may be mounted on the first side of the printed circuit board. In an alternative aspect, the first integrated circuit chip may be mounted on the first side of the printed circuit board and the second integrated circuit chip may be mounted on the second side of the printed circuit board. In yet another aspect, the apparatus may further comprise a hand held housing encapsulating the first integrated circuit chip, the second integrated circuit chip, and the printed circuit board. In another aspect, the processing of image signals generated by the wafer level camera for attempting to decode the bar code symbol may be performed within the housing. In an alternative aspect, the processing of image signals generated by the wafer level camera for attempting to decode the bar code symbol may be performed by circuitry external to the housing. In another aspect, the processing of image signals generated by the wafer level camera for attempting to decode the bar code symbol is performed by a circuit disposed on the printed circuit board. In another aspect, the processing of image signals generated by the wafer level camera for attempting to decode the bar code symbol is performed by a computer external to the housing.

In one aspect, the light source may be an LED. In another aspect, the apparatus may further comprise a light circuitry for controlling the operation of the light source, the light source electrically connected to the light circuitry, and the light circuitry disposed on the printed circuit board. In another aspect, the apparatus may include an aimer light source positioned on the first integrated circuit chip and the apparatus may be adapted to direct light from the aimer light source toward a field of view of the apparatus. The aimer light source may be an LED. The apparatus may include an aimer subsystem and an aimer light circuitry for controlling the operation of an aimer light bank, the aimer light bank electrically connected to the aimer light circuitry, and the aimer light circuitry electrically connected to the first integrated circuit chip. In yet another aspect, the apparatus may further comprise a light source positioned on the first integrated circuit chip, the apparatus may be adapted to direct light from the light source toward a field of view of the apparatus and an aimer light source positioned on the first integrated circuit chip, the apparatus being adapted to direct light from the aimer light source toward a field of view of the apparatus.

DETAILED DESCRIPTION OF THE INVENTION

In traditional applications, barcode engines and other scanning devices have typically been disposed on multiple Printed Circuit Boards (PCBs). Multiple PCBs have been required because image based barcode scanners required a large number of component parts, including, but not limited to, an image sensor, a lens assembly, an illumination light source, an aimer light source, a microcontroller, processor, RAM, and/ or flash memory some of which were large and/or bulky. Further, in traditional applications each of the components has been soldered onto the PCB separately. Where additional PCBs are used, the costs and the risk of product failure due to potential connection problems between PCBs increase. In addition, the traditional applications have constraints or limitations on the size of the PCBs.

According to the present invention, more than one of the required components for an imaging based barcode scanner engine may be disposed on a common PCB. Further and according to the present invention, the required parts may be placed on at least two integrated circuit chips which may be vertically stacked in an X-Y plane onto the PCB. The placement of component parts on a common PCB reduces the overall cost and risk of failure of the imaging based barcode scanner engine. In various embodiments, an integrated circuit including, for example, a wafer level camera module, an illumination light source, and/or an aimer light source may all be disposed on a single PCB. If desired, additional elements may be placed on a common PCB by adding additional integrated circuit chips vertically stacked in the X-Y plane on the PCB. Sets of vertically stacked integrated circuit chips may also be placed on the PCB side by side to decrease the size requirements of the PCB.

Figure 9:
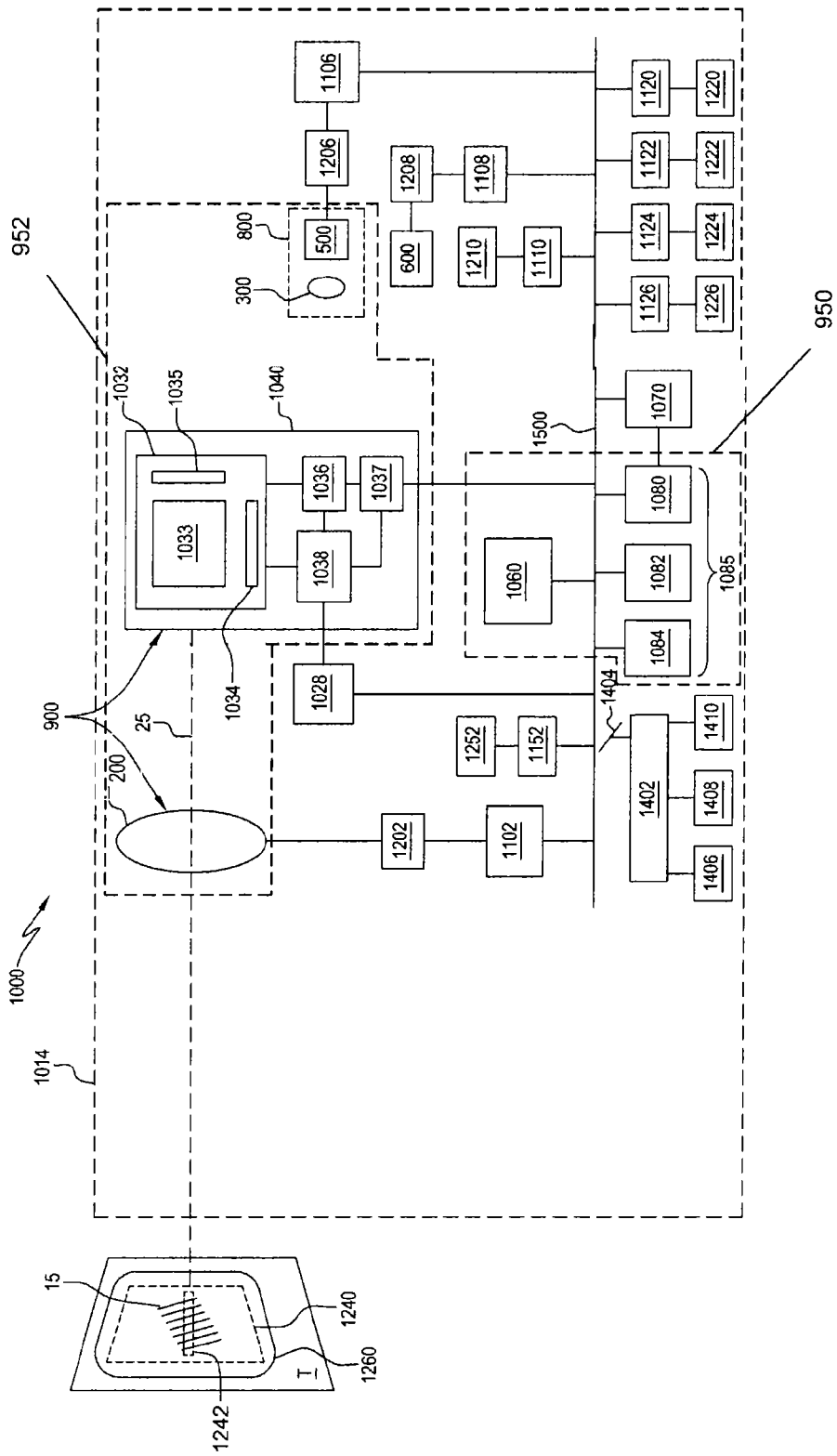
FIG. 9 is a block diagram of an apparatus for use in decoding a bar code symbol, the apparatus having multiple elements supported on a common printed circuit board, in accordance with an aspect of the invention.
Figure 10:
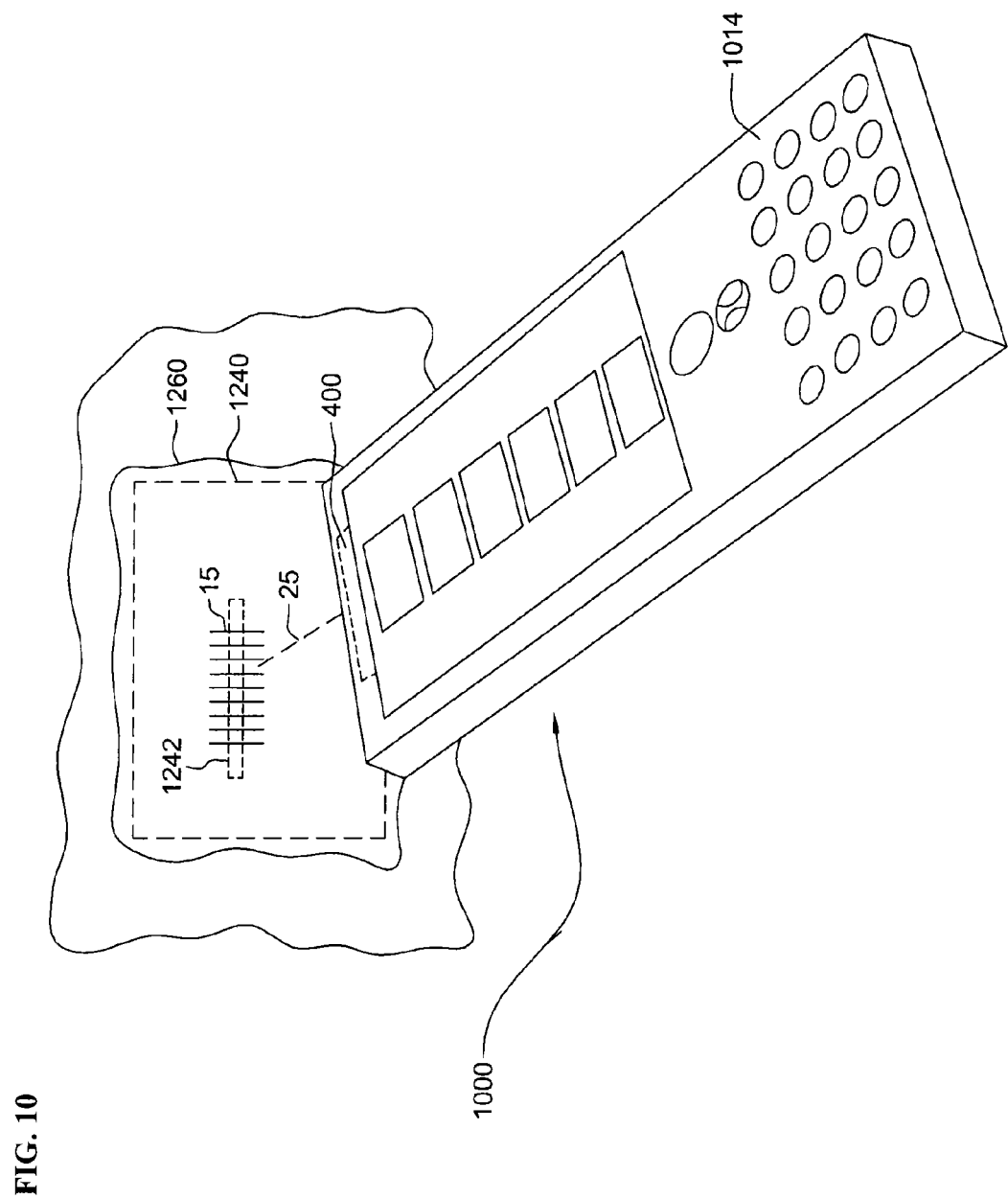
FIG. 10 is a perspective view of an apparatus for use in decoding a bar code symbol, in accordance with an aspect of the invention.

Referring now to FIGS. 1-4, a first integrated circuit package 952 and a second integrated circuit package 950 for an apparatus 1000, as seen in FIGS. 9-10, for use in decoding a barcode symbol are shown. The first package 952 may include one or more integrated circuit chips, such as, a wafer level camera 900 and at least one light source combined. In the depicted embodiment there is a wafer level camera 900 and two light sources 502 and 602, discussed in greater detail hereinafter, on the first package 952. The second package 950 may include one or more integrated circuit chips, such as, a CPU 1060 and system memory 1080. Additional integrated circuit packages including additional integrated circuit chips may also be included in apparatus 1000.

Figure 2:
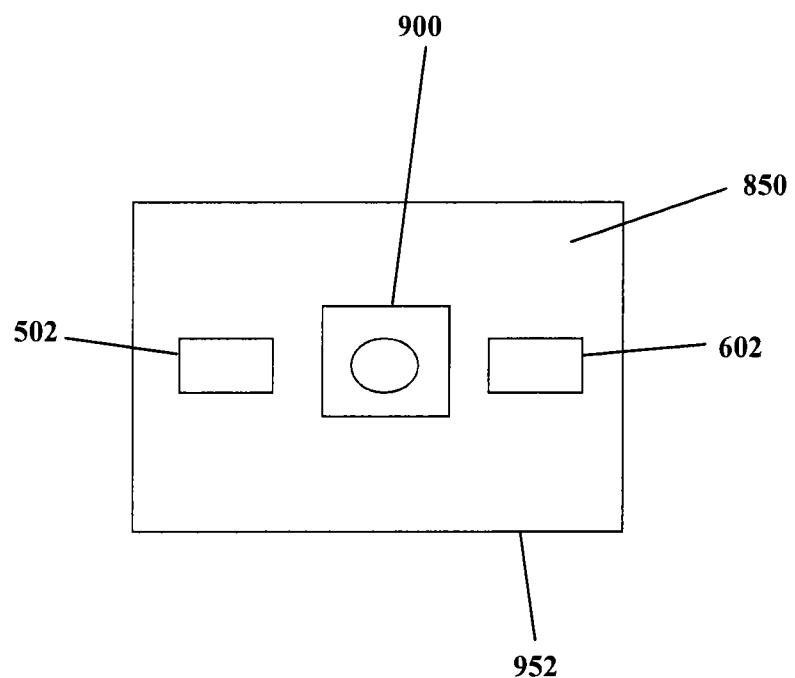
FIG. 2 is a top view of a first integrated circuit chip of an apparatus for use in decoding a bar code symbol, in accordance with an aspect of the invention.
Figure 3:
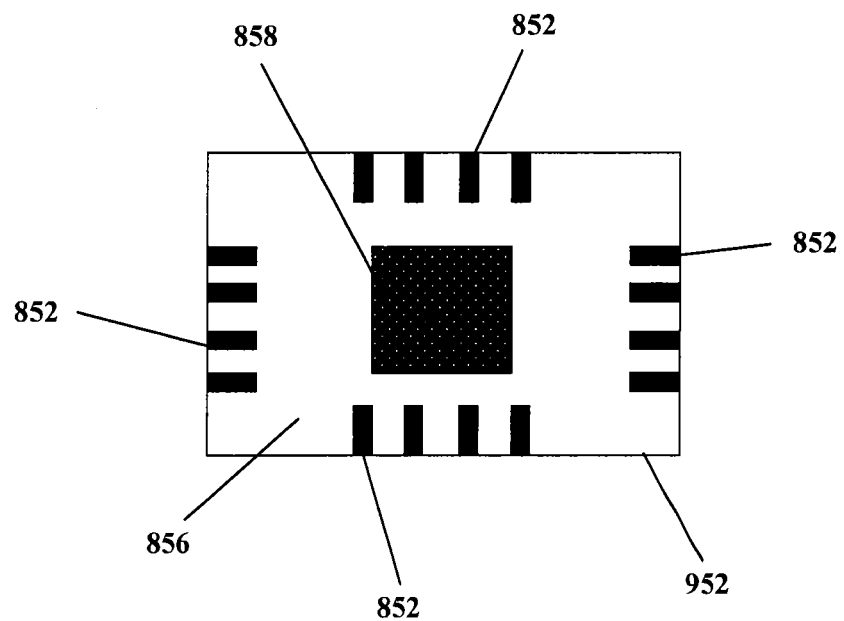
FIG. 3 is a bottom view of an integrated circuit chip with a leadless chip carrier (LCC) package for an apparatus for use in decoding a bar code symbol, in accordance with an aspect of the invention.
Figure 4:
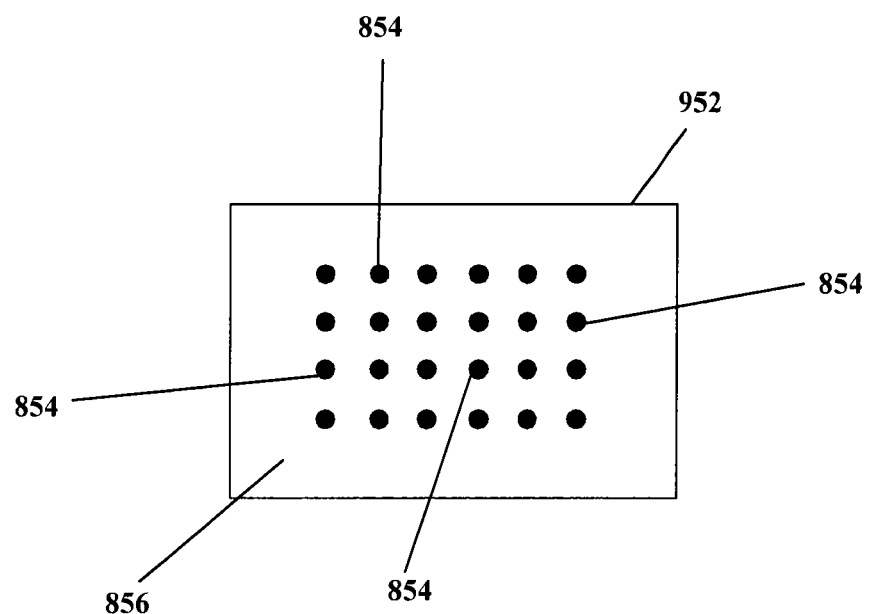
FIG. 4 is a bottom view of a integrated circuit chip with a ball grid array (BGA) package for an apparatus for use in decoding a bar code symbol, in accordance with an aspect of the invention.
Figure 5:
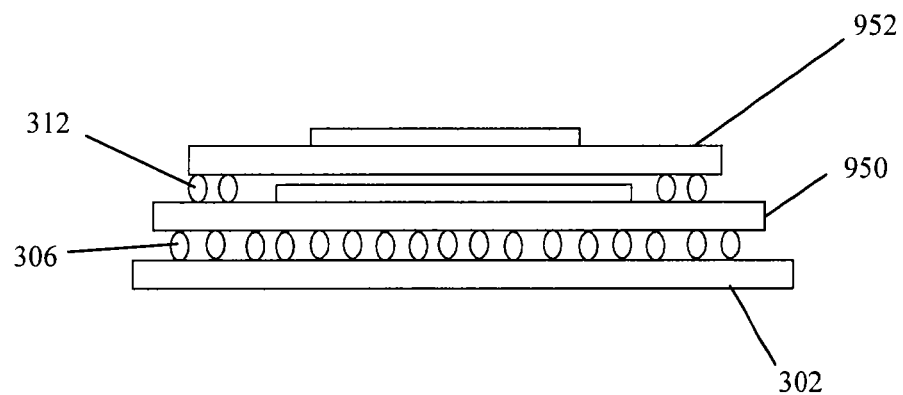
FIG. 5 is a side cross-sectional view of a first embodiment apparatus for use in decoding a bar code symbol including the two integrated circuit chips of FIG. 1 mounted on a printed circuit board, in accordance with an aspect of the invention.
Figure 6:
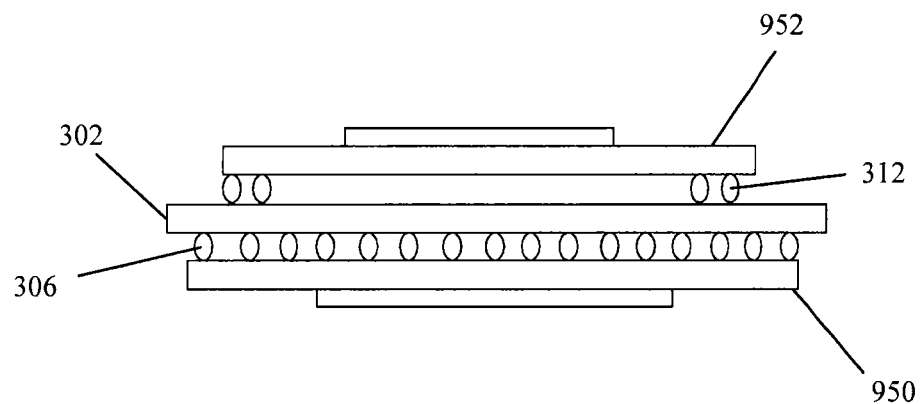
FIG. 6 is a side cross-sectional view of a second embodiment apparatus for use in decoding a bar code symbol including the two integrated circuit chips of FIG. 1 mounted on a printed circuit board, in accordance with an aspect of the invention.

The first package 952 and the second package 950 may be leadless chip carrier (LCC) packages, as seen in FIG. 3, or ball grid array (BGA) packages, as seen in FIG. 4. The LCC and BGA packages allow two or more packages to be stacked vertically on top of each other to enable smaller devices to be made. BGA packages may also provide more pins or pads 854 for connection than LCC packages. Referring to FIGS. 2-4, the integrated circuit chips will be mounted on a first side 850 of the first package 952 and a plurality of chip pads 852 or 854 will be on a second side 856 of the first package 952. The chip pads 852 are chip pads for a LCC package which are located around the perimeter of the second side 856 and the chip pads 854 are chip pads for a BGA package which are located across the entire surface of the second side 856. The LCC package may also have a metal pad 858. The metal pad 858 may help increase the heat dissipation rate of the first and second packages 952 and 950 during operation when a lot of heat may be generated. The heat dissipation rate of the first and second packages 952 and 950 may also be assisted by making the side of the first and second packages 952 and 950 which the components are mounted to metal, for example, first side 850 of the first package 952 may be comprised of metal. Similarly, the second package 950 may have chip pads 852 or chip pads 854 on the second side of the second package 950, thereby making the second package 950 either an LCC package or a BGA package, respectively.

Figure 7:
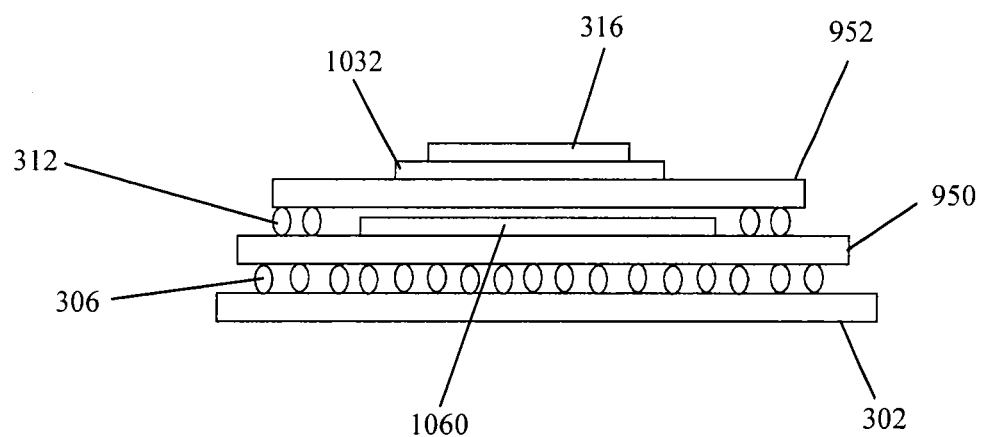
FIG. 7 is a side cross-sectional view of a third embodiment apparatus for use in decoding a bar code symbol including two integrated circuit chips mounted on a printed circuit board, in accordance with an aspect of the invention.
Figure 8:
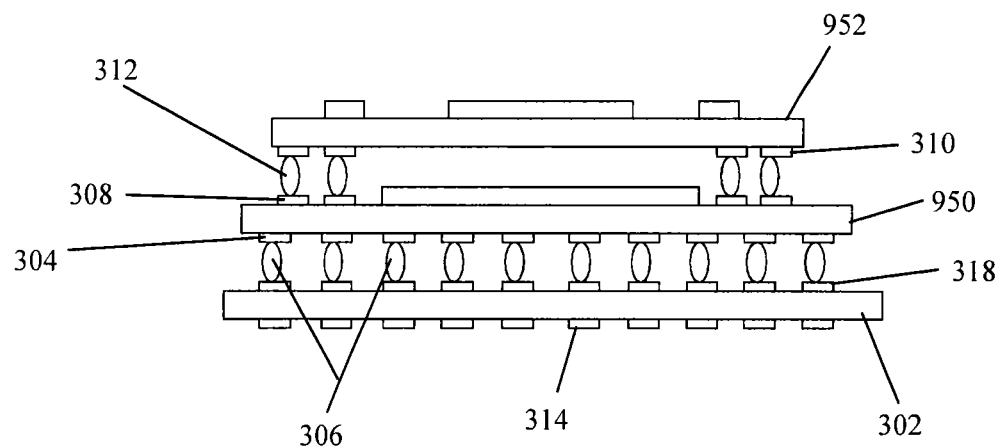
FIG. 8 is a side cross-sectional view of a forth embodiment apparatus for use in decoding a bar code symbol, in accordance with an aspect of the invention.

Referring now to FIGS. 5-8, at least one contact pad 318 may be disposed on a first surface of circuit board 302, which may be a printed circuit board. At least one electrode pad 304 may be disposed on a surface of the second integrated circuit package 950. At least one conductive adhesive connector 306 may be disposed between the at least one electrode pad 304 of the second integrated circuit package 950 and the at least one contact pad 318 of the circuit board 302. The second integrated circuit package 950 may also have at least one contact pad 308 disposed on a surface. At least one electrode pad 310 may be disposed on a surface of the first integrated circuit package 952. As seen in FIG. 8, at least one conductive adhesive connector 312 may be disposed between the at least one electrode pad 310 of the first integrated circuit package 952 and the at least one contact pad 308 of the second integrated circuit package 950. In an alternative embodiment seen in FIGS. 6 and 8, the at least one conductive adhesive connector 312 may be disposed between the at least one electrode pad 310 of the first integrated circuit package 952 and at least one contact pad 314 disposed on a second surface of circuit board 302. In at least one embodiment, the at least one conductive adhesive connectors 306, 312 may be comprised of solder; however, alternative suitable materials may be used.

A material such as a resin or organic material may be placed over and/or around the components on the first integrated circuit package 952 and the second integrated circuit package 950 to prevent damage and insure proper performance. In addition the application of resin or organic material over and/or around the components on the first integrated circuit package 952 and the second integrated circuit package 950 may strengthen, protect, and/or secure the electric and physical connection. In yet another alternative embodiment as seen in FIG. 7, the first integrated circuit package 952 and the second integrated circuit package 950 are connected to the circuit board 302 as described above with reference to FIG. 5 and may further include additional components 316 on the first integrated circuit package 952. For example, the first integrated circuit package 952 may have additional components 316, such as an aiming subsystem 600.

An exemplary hardware platform for support of operations described herein with reference to an apparatus 1000 for use in decoding a bar code symbol is shown and described with reference to FIG. 9. The bar code decoding apparatus 1000 may include a housing 1014. Apparatus 1000 can also include an image sensor 1032 comprising a multiple pixel image sensor array 1033 having pixels arranged in rows and columns of pixels, associated column circuitry 1034 and row circuitry 1035. Associated with the image sensor 1032 can be amplifier or gain circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040.

The image sensor integrated circuit 1040 can incorporate fewer than the noted number of components. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging subsystem of apparatus 1000 can include an image sensor 1032 and an imaging lens assembly 200 for focusing an image onto image sensor array 1033 of image sensor 1032.

In the course of operation of apparatus 1000, image signals can be read out of image sensor 1032, converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in RAM 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, imaging lens assembly 200 can be adapted for focusing an image of a decodable indicia 15 located within a field of view 1240 on a substrate, T, onto image sensor array 1033. A size in target space of a field of view 1240 of apparatus 1000 can be varied in a number of alternative ways. A size in target space of a field of view 1240 can be varied, e.g., by changing a terminal to target distance, changing an imaging lens assembly setting, changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances). The lens assembly 200 and image sensor integrated circuit 1040 combine to create a wafer level camera 900.

Apparatus 1000 can include an illumination subsystem 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. The apparatus 1000 may be configured so that the light source 502 from light source bank 500 is directed toward a field of view 1240. Thus in various embodiments, light source bank 500 may be configured such that is affixed to the apparatus 1000, while in other embodiments light source bank 500 may be remote and direct light toward apparatus 1000 or field of view 1240. In yet another embodiment, light source bank 500 may be comprised of a light source 502 affixed to the apparatus 1000 and a light source that is remote and direct light towards apparatus 1000 or field of view 1240.

In addition, the illumination subsystem 800 may have a light source bank 500 provided by single light source. The single light source may be, for example purposes, an LED. In another embodiment, light source bank 500 can be provided by more than one light source for example, more than one LED. Apparatus 1000 can be adapted so that light from each of a one or more light source of the light source bank 500 is directed toward field of view 1240 and utilized for projection of illumination pattern 1260. Still referring to FIG. 9, apparatus 1000 can also include an aiming subsystem 600 for projecting an aiming pattern 1242. Aiming subsystem 600, which can comprise a light source bank, can be coupled to aiming light source bank power input unit 1208 for providing electrical power to a light source bank of aiming subsystem 600. The aiming light source bank may be, for example, one or more light sources 602. Apparatus 1000 can be adapted so that light from one or more light source of aiming subsystem 600 is directed toward field of view 1240 and is utilized for projection of aiming pattern 1242. Aiming light source bank power input unit 1208 can be coupled to system bus 1500 via interface 1108 for communication with CPU 1060.

In one embodiment, illumination subsystem 800 can include, in addition to light source bank 500, an illumination lens assembly 300, as is shown in the embodiment of FIG. 9. In addition to or in place of illumination lens assembly 300, the illumination subsystem 800 can include alternative light shaping optics, e.g. one or more diffusers, mirrors and prisms. In use, apparatus 1000 can be oriented by an operator with respect to a target, T, (e.g., a piece of paper, a package, another type of substrate) bearing decodable indicia 15 in such manner that illumination pattern 1260 is projected onto decodable indicia 15. In the example of FIG. 9, decodable indicia 15 is provided by a 1D bar code symbol. Decodable indicia 15 could also be provided by a 2D bar code symbol or optical character recognition (OCR) characters. Referring to further aspects of apparatus 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 (e.g., USB, RS232), and/or AC/DC transformer 1410.

Further regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image information from image sensor array 1033 (typically in the form of analog signals) and then storage of the image information after conversion into system memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. CPU 1060, which, as noted, can be operative in performing processing for attempting to decode decodable indicia, can be incorporated into an integrated circuit disposed on circuit board.

Apparatus 1000 can include various interface circuits for coupling various peripheral devices to the system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include range detector unit 1210 coupled to system bus 1500 via interface 1110. In one embodiment, range detector unit 1210 can be an acoustic range detector unit. Apparatus 1000 can also include a keyboard 1226 coupled to system bus 1500 via interface 1126. Various interface circuits of apparatus 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls. Apparatus 1000 may include a network communication interface 1252 coupled to system bus 1500 and in communication with CPU 1060, via interface 1152. Network communication interface 1252 may be configured to communicate with an external computer through a network.

A succession of frames of image data that can be captured and subject to the described processing can be full frames (including pixel values corresponding to each pixel of image sensor array 1033 or a maximum number of pixels read out from image sensor array 1033 during operation of apparatus 1000). A succession of frames of image data that can be captured and subject to the described processing can also be "windowed frames" comprising pixel values corresponding to less than a full frame of pixels of image sensor array 1033.

A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 1000 can capture frames of image data at a rate known as a frame rate. A typical frame rate is 60 frames per second (FPS) which translates to a frame time (frame period) of 16.6 ms. Another typical frame rate is 30 FPS which translates to a frame time (frame period) of 33.3 ms per frame. A frame rate of apparatus 1000 can be increased (and frame time decreased) by decreasing of the frame picture size.

In the embodiments depicted in FIGS. 1-10, the wafer level camera 900 and at least one light source 502 from light source bank 500 are packaged into the first integrated circuit package 952. The first integrated circuit package 952 can incorporate fewer than the noted number of components. Alternatively, the first integrated circuit package 952 can incorporate more than the noted number of components. The CPU 1060 and RAM 1080 are packaged into the second integrated circuit package 950. The second integrated circuit package 950 can incorporate fewer than the noted number of components. Alternatively, the second integrated circuit package 950 can incorporate more than the noted number of components. As discussed above with reference to FIGS. 2-4 the first integrated circuit package 952 and the second integrated circuit package 950 may be vertically stacked on top of each other and then mounted onto the surface of a circuit board 302, which may be a printed circuit board.

Referring now to FIGS. 9 and 10 with continued reference to FIGS. 1-8, the elements as discussed above may be partially or wholly disposed within a housing 1014, which in one embodiment can be a hand held housing. In the embodiments described above the conductive adhesive connectors may provide electrical input/output and mechanical connections between the printed circuit board 402 and the wafer level camera 900, the light source bank 500 and/or the aiming subsystem 600. One or more light source, such as light source 502, of light source bank 500 may be positioned on the first integrated circuit package 952 to minimize light waste. More specifically, one or more light source of light source bank 500 may extend approximately the same distance away from the first integrated circuit package 952 as lens assembly 200, which is also positioned on the first integrated circuit package 952. In alternative embodiments, one or more light source of the light source bank 500 may extend further away from first integrated circuit package 952 than lens assembly 200. Apparatus 1000 can be adapted so that light produced by each of a one or more light source of light source bank 500 may be utilized for projection of an illumination pattern 1260 for illumination of a field of view 1240 (shown in FIGS. 9-10) or in a manner sufficient for decodable indicia to be read. In a similar manner, one or more light source, such as light source 602, of aiming subsystem 600 may similarly be positioned on first integrated circuit package 952 in order to minimize light waste. In one embodiment, aiming subsystem 600 extends substantially the same distance away from the first integrated circuit package 952 as lens assembly 200. However, in other embodiments the relative distance of the lens assembly 200 and aiming subsystem 600 may be adjusted relative to one another to reach a suitable configuration.

Now referring to FIG. 10, an example apparatus 1000 is shown. Specifically, apparatus 1000 may have a housing 1014, as shown in FIG. 10, which may be a hand held housing. Housing 1014 is configured to encapsulate wafer level camera 900 (shown in FIG. 9). A microprocessor integrated circuit, not shown, having a CPU for attempting to decode decodable indicia can be disposed on circuit board 302. Such microprocessor integrated circuit may be disposed externally to circuit board 302, for example, on a circuit board external to circuit board 302 within housing 1014. In another embodiment, apparatus 1000 may include CPU 1060, memory 1085, and network communication interface 1252 comprising a first computer housed within housing 1014 (shown in FIG. 9), and a second computer, not shown, external to housing 1014, having a CPU, memory, and a network communication interface. Image data can be transmitted to the second computer for processing by the CPU for attempting to decode decodable indicia.

A small sample of systems methods and apparatus that are described herein is as follows:

A1. An apparatus for use in decoding a bar code symbol, the apparatus comprising:
a first integrated circuit chip having a wafer level camera with a sensor and a lens, at least one light source, and a plurality of contact pads disposed on a first surface of the first integrated circuit chip;
a second integrated circuit chip having a processor, a memory, a plurality of contact pads disposed on a first surface of the second integrated circuit chip, and a plurality of contact pads disposed on a second surface of the second integrated circuit chip;
a printed circuit board having a plurality of contact pads disposed on at least one surface of the printed circuit board;
wherein the first integrated circuit chip and the second integrated circuit chip are stacked in an X-Y plane on the printed circuit board in a manner that the plurality of contact pads on the first integrated circuit chip define an interface with the plurality of contact pads on the second integrated circuit chip to allow the communication of signals between the first integrated circuit chip and the second integrated circuit chip, and the plurality of contact pads on the second integrated circuit chip define an interface with the plurality of contact pads on the printed circuit board to allow the communication of signals between the first integrated circuit chip, second integrated circuit chip, and printed circuit board; and
wherein the apparatus is operative for processing of image signals generated by the wafer level camera for attempting to decode the bar code symbol.

A2. The apparatus of claim A1, wherein the printed circuit board has a first side and a second side.

A3. The apparatus of claim A2, wherein the first integrated circuit chip is mounted on the second integrated circuit chip and the second integrated circuit chip is mounted on the first side of the printed circuit board.

A4. The apparatus of claim A2, wherein the first integrated circuit chip is mounted on the second integrated circuit chip and the second integrated circuit chip is mounted on the second side of the printed circuit board.

A5. The apparatus of claim A1, further comprising a hand held housing encapsulating the first integrated circuit chip, the second integrated circuit chip, and the printed circuit board.

A6. The apparatus of claim A5, wherein the processing of image signals generated by the wafer level camera for attempting to decode the bar code symbol is performed within the hand held housing.

A7. The apparatus of claim A5, wherein the processing of image signals generated by the wafer level camera for attempting to decode the bar code symbol is performed by circuitry external to the housing.

A8. The apparatus of claim A5, wherein the processing of image signals generated by the wafer level camera for attempting to decode the bar code symbol is performed by a circuit disposed on said printed circuit board.

A9. The apparatus of claim A5, wherein the processing of image signals generated by the wafer level camera for attempting to decode the bar code symbol is performed by a computer external to the housing.

A10. The apparatus of claim A1, wherein the at least one light source is an LED.

A11. The apparatus of claim A1, further comprising: a light circuitry for controlling the operation of the light source, the light source electrically connected to the light circuitry, and the light circuitry disposed on said printed circuit board.

A12. The apparatus of claim A1, further comprising: an aimer light source positioned on the first integrated circuit chip, the apparatus being adapted to direct light from the aimer light source toward a field of view of the apparatus.

A13. The apparatus of claim A12, wherein the apparatus includes the aimer light source is an LED.

A14. The apparatus of claim A1, further comprising: an aimer subsystem and an aimer light circuitry for controlling the operation of an aimer light bank, the aimer light bank electrically connected to the aimer light circuitry, and the aimer light circuitry electrically connected to the first integrated circuit chip.

A15. The apparatus of claim A1, further comprising: a light source positioned on the first integrated circuit chip, the apparatus being adapted to direct light from the light source toward a field of view of the apparatus and an aimer light source positioned on the first integrated circuit chip, the apparatus being adapted to direct light from the aimer light source toward a field of view of the apparatus.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An apparatus for use in decoding a bar code symbol, the apparatus comprising:
a first integrated circuit chip having a wafer level camera with a sensor and a lens, at least one light source, and a plurality of contact pads disposed on a first surface of the first integrated circuit chip;
a second integrated circuit chip having a processor, a memory, a plurality of contact pads disposed on a first surface of the second integrated circuit chip, and a plurality of contact pads disposed on a second surface of the second integrated circuit chip;
a printed circuit board having a plurality of contact pads disposed on at least one surface of the printed circuit board;
wherein the first integrated circuit chip and the second integrated circuit chip are stacked in an X-Y plane on the printed circuit board in a manner that the plurality of contact pads on the first integrated circuit chip define an interface with the plurality of contact pads on the second integrated circuit chip to allow a communication of signals between the first integrated circuit chip and the second integrated circuit chip, and the plurality of contact pads on the second integrated circuit chip define an interface with the plurality of contact pads on the printed circuit board to allow a communication of signals between the first integrated circuit chip, second integrated circuit chip, and printed circuit board; and
wherein the apparatus is operative for processing of image signals generated by the wafer level camera for attempting to decode the bar code symbol.

2. The apparatus of claim 1, wherein the printed circuit board has a first side and a second side.

3. The apparatus of claim 2, wherein the first integrated circuit chip is mounted on the second integrated circuit chip and the second integrated circuit chip is mounted on the first side of the printed circuit board.

4. The apparatus of claim 2, wherein the first integrated circuit chip is mounted on the second integrated circuit chip and the second integrated circuit chip is mounted on the second side of the printed circuit board.

5. The apparatus of claim 1, further comprising a hand held housing encapsulating the first integrated circuit chip, the second integrated circuit chip, and the printed circuit board.

6. The apparatus of claim 5, wherein the processing of image signals generated by the wafer level camera for attempting to decode the bar code symbol is performed within the hand held housing.

7. The apparatus of claim 5, wherein the processing of image signals generated by the wafer level camera for attempting to decode the bar code symbol is performed by circuitry external to the housing.

8. The apparatus of claim 5, wherein the processing of image signals generated by the wafer level camera for attempting to decode the bar code symbol is performed by a circuit disposed on said printed circuit board.

9. The apparatus of claim 5, wherein the processing of image signals generated by the wafer level camera for attempting to decode the bar code symbol is performed by a computer external to the housing.

10. The apparatus of claim 1, wherein the at least one light source is an LED.

11. The apparatus of claim 1, further comprising:
a light circuitry for controlling the operation of the light source, the light source electrically connected to the light circuitry, and the light circuitry disposed on said printed circuit board.

12. The apparatus of claim 1, further comprising:
an aimer light source positioned on the first integrated circuit chip, the apparatus being adapted to direct light from the aimer light source toward a field of view of the apparatus.

13. The apparatus of claim 12, wherein the aimer light source is an LED.

14. The apparatus of claim 1, further comprising:
an aimer subsystem and an aimer light circuitry for controlling the operation of an aimer light bank, the aimer light bank electrically connected to the aimer light circuitry, and the aimer light circuitry electrically connected to the first integrated circuit chip.

15. The apparatus of claim 1, further comprising:
a light source positioned on the first integrated circuit chip, the apparatus being adapted to direct light from the light source toward a field of view of the apparatus and an aimer light source positioned on the first integrated circuit chip, the apparatus being adapted to direct light from the aimer light source toward a field of view of the apparatus.

* * * * *